(12) United States Patent
Saunders et al.

(10) Patent No.: US 8,533,836 B2
(45) Date of Patent: Sep. 10, 2013

(54) IDENTIFYING SOFTWARE EXECUTION BEHAVIOR

(75) Inventors: Allen Mark Saunders, Potomac Falls, VA (US); Andrew Walter Ruef, Columbia, MD (US)

(73) Assignee: AccessData Group, LLC, Lindon, UT (US)

( * ) Notice: Subject to any disclaimer, the term of this patent is extended or adjusted under 35 U.S.C. 154(b) by 62 days.

(21) Appl. No.: 13/350,521

(22) Filed: Jan. 13, 2012

(65) Prior Publication Data

US 2013/0185798 A1 Jul. 18, 2013

(51) Int. Cl.
*G06F 11/00* (2006.01)

(52) U.S. Cl.
USPC .......... 726/24; 726/22; 726/25; 717/127; 717/128

(58) Field of Classification Search
USPC .......... 726/22, 24, 25; 717/127, 128
See application file for complete search history.

(56) References Cited

U.S. PATENT DOCUMENTS

| | | | |
|---|---|---|---|
| 2002/0144236 A1* | 10/2002 | Beer et al. | 717/124 |
| 2004/0078538 A1 | 4/2004 | Dutt | |
| 2004/0088690 A1* | 5/2004 | Shaul | 717/154 |
| 2004/0264367 A1* | 12/2004 | Edwards | 370/229 |
| 2005/0177736 A1* | 8/2005 | de los Santos et al. | 713/188 |
| 2007/0234070 A1 | 10/2007 | Horning | |
| 2008/0028474 A1 | 1/2008 | Horne | |
| 2008/0127125 A1 | 5/2008 | Anckaert | |
| 2008/0250018 A1* | 10/2008 | Geffner et al. | 707/6 |
| 2008/0250231 A1* | 10/2008 | Tagawa et al. | 712/220 |
| 2009/0187750 A1 | 7/2009 | Bugnion | |
| 2010/0095376 A1 | 4/2010 | Rodriguez | |
| 2010/0281468 A1 | 11/2010 | Pavlyushchik | |

OTHER PUBLICATIONS

Emmerick, et al., "Using a Decompiler for Real-World Source Recovery", Reverse Engineering, Proceedings, 11th Working Conference, Nov. 8-12, 2004; pp. 27-36; Schedule of ITEE, Queensland University, Brisbane, Australia; retrieved from the internet Mar. 7, 2013.

* cited by examiner

*Primary Examiner* — Beemnet Dada
*Assistant Examiner* — Kalish Bell
(74) *Attorney, Agent, or Firm* — Fish & Associates, PC

(57) ABSTRACT

The present invention extends to methods, systems, and computer program products for identifying software execution behavior. Embodiments of the invention can be used to assist a user in a making a reasoned and informed decision about whether the behavior of executable code is malicious. Data indicative of executable code behavior can be collected statically without having to execute the executable code. Behavior data can be collected essentially automatically with little, if any, user involvement. A user initiates analysis of executable code and is provided a visual categorized representation of behavior data for the executable code.

18 Claims, 3 Drawing Sheets

*200*

201

Accessing A Portion Of Assembly Code, The Portion Of Assembly Code Disassembled From The Portion Of Binary Code, The Portion Of Assembly Code Including Assembly Language Instructions From An Assembly Language Instruction Set

202

Converting The Portion Of Assembly Code To An Intermediate Representation, The Intermediate Representation Including Intermediate Representation Instructions From An Intermediate Representation Instruction Set, Converting The Portion Of Assembly Code Including:

203

Mapping Each Assembly Language Instruction To A Corresponding Ordered List Of One Or More Intermediate Representation Instructions So As To Reduce The Complexity Of Analyzing The Behavior Of The Portion Of Binary Code

204

Tracking The Path Of One Or More Parameters Within Functions Of The Intermediate Representation To Identify One Or More Of: Parameter Values And Parameter Types Used To Call Functions Of Interest Within The Portion Of Binary Code

205

Outputting One Or More Of: Functions, Parameter Values, And Parameters Types Of Interest For The Portion Of Binary Code

*Figure 2*

IDENTIFYING SOFTWARE EXECUTION BEHAVIOR

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Before executing a software program to perform computing tasks, it is often advisable to verify that the software program is legitimate. Verifying the legitimacy of a software program can include checking the software program for malicious behaviors. For example, a software program can be checked to determine if it includes a virus, spyware, a Trojan horse, etc.

However, identifying malicious behavior within a software program is a somewhat ambiguous process that requires specialized computer skills beyond that of an average computer user. For example, network traffic to an unknown host may be malicious or may be a legitimate part of a software program. Without more knowledge, such as, the content of data being set to the unknown host, a typical computer user is not qualified to determine the legitimacy of such network traffic.

Accordingly, there are at least two conventional approaches used to identify malicious behavior within a software program. One approach includes a skilled worker manually analyzing software program code line by line to look for malicious behavior. Analyzing software program code manually is often referred to as "static analysis", since malicious behavior within a software program can be identified without running the software program.

Another approach includes running a software program in a protected environment, such as, for example, a "sandbox". During execution, the behavior of the software program is observed, recorded, and analyzed. Analyzing software program code during execution is often referred to as "dynamic analysis". Unfortunately, there is increased risk associated with dynamic analysis approaches, since a software program has to actually be run (as opposed to manual line by line analysis) to perform the analysis. Even within a protected environment, execution of a software program can expose the environment to malicious behavior within the software program.

Further, when a software program is run in a single environment (e.g., within a sandbox), the software program may not exhibit all possible behaviors. For example, a software program can condition certain behaviors based on environmental data, such as, for example, user name, operating system version, data, time, etc. If the environmental data does not satisfy conditions, malicious behavior may not be revealed. For example, a software program can include malicious behavior that is not performed until after a specified date. Thus, dynamic analysis within a sandbox prior to the specified date would not reveal the malicious behavior.

Some products attempt to lessen the burden on computer users with signature based approaches to detecting code (e.g., viruses) that exhibits malicious behavior. A skilled worker (e.g., at a software security corporation) analyzes code (statically and/or dynamically). When malicious behavior is identified, a signature for code that exhibits the malicious behavior is generated and pushed out to users. Users can then run a program (e.g., a virus scanner) to check their computer for code exhibiting the malicious behavior. The program checks the computer determining if any software programs at the computer system include code matching the signature. If a match is found, the matched software program is indicated as including malicious behavior.

However, signature based approaches to detecting malicious behavior suffer from a number of difficulties. When a signature is generated, there is always some chance that the generated signature also matches code within legitimate software (e.g., in operating system routines). When a signature matches code in legitimate software, a program using the generated signature can incorrectly identify the legitimate software as including malicious behavior. Some programs automatically disable software programs that exhibit malicious behavior. Thus, when legitimate software is incorrectly identified as malicious, the legitimate software can be disabled. Disabling legitimate software can annoy a user and prevent normal use of a computer system (e.g., when the disabled legitimate software is part of an operating system).

BRIEF SUMMARY

The present invention extends to methods, systems, and computer program products for identifying software execution behavior. A portion of assembly code is accessed. The portion of assembly code includes assembly language instructions from an assembly language instruction set. The portion of assembly code was disassembled from a corresponding portion of binary code.

The portion of assembly code is converted into an intermediate representation. The intermediate representation includes intermediate representation instructions from an intermediate representation instruction set. Converting the portion of assembly code includes mapping each assembly language instruction to a corresponding ordered list of one or more intermediate representation instructions. The ordered list of intermediate representation instructions reduces the complexity of analyzing the behavior of the portion of binary code.

The path of one or more parameters is tracked within functions of the intermediate representation. Tracking can identify one or more of: parameter values and parameter types used to call functions of interest within the portion of binary code. One or more of functions, parameter values, and parameters types of interest is output for the portion of binary code.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a flow chart of an example method for identifying software execution behavior.

DETAILED DESCRIPTION

Figure 1:
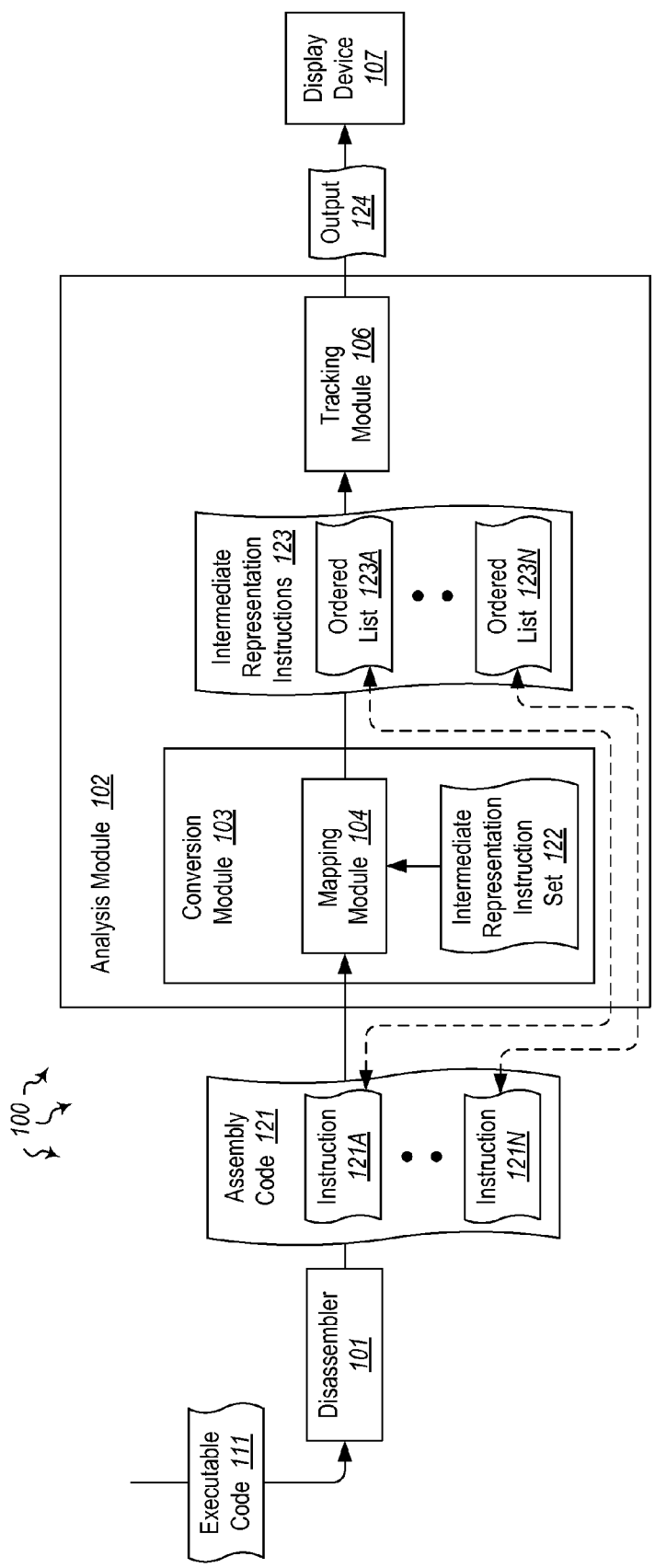
FIG. 1 illustrates an example computer architecture that facilitates identifying software execution behavior.

The present invention extends to methods, systems, and computer program products for identifying software execution behavior. A portion of assembly code is accessed. The portion of assembly code includes assembly language instructions from an assembly language instruction set. The portion of assembly code was disassembled from a corresponding portion of binary code.

The portion of assembly code is converted into an intermediate representation. The intermediate representation includes intermediate representation instructions from an intermediate representation instruction set. Converting the portion of assembly code includes mapping each assembly language instruction to a corresponding ordered list of one or more intermediate representation instructions. The ordered list of intermediate representation instructions reduces the complexity of analyzing the behavior of the portion of binary code.

The path of one or more parameters is tracked within functions of the intermediate representation. Tracking can identify one or more of: parameter values and parameter types used to call functions of interest within the portion of binary code. One or more of functions, parameter values, and parameters types of interest is output for the portion of binary code.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates identifying software execution behavior. Referring to FIG. 1, computer architecture 100 includes disassembler 101, analysis module 102, and display device 107. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, disassembler 101 is configured to receive executable code (e.g., a ".exe" or ".dll" file) and disassemble the executable (binary) code into assembly code including a plurality of assembly language instructions (e.g., x86 assembly language instructions).

Analysis module 102 can access assembly code. Analysis module 102 is configured to analyze assembly language instructions within accessed assembly code to determine the execution behavior of executable code that was disassembled to formulate the assembly code. Analysis module 102 can output data indicating the execution behavior of the executable code.

As depicted, analysis module 102 includes conversion module 103 and tracking module 106. Conversion module 103 further includes mapping module 104 and intermediate representation instruction set 122. Generally, conversion module 103 converts assembly language instructions into intermediate representation instructions. In some embodiments, each assembly language instruction is "broken down" into one or more intermediate representation instructions that collectively represent the functionality of the assembly language instruction.

More specifically, mapping module 102 can access an assembly language instruction. Mapping module 102 can refer to intermediate representation instruction set 122 to map the assembly language instruction to one or more (e.g., an ordered set of) intermediate representation instructions that collectively represent the functionality of the assembly language instruction. Intermediate representation instruction set 122 can include fewer instructions overall than a corresponding assembly language instruction set. Through different groupings of intermediate representation instructions, the functionality of assembly language instructions included in the corresponding assembly language instruction set can be appropriately represented. For each assembly language instruction, mapping module 102 can output the one or more (or ordered set of) identified intermediate representation instructions to an intermediate representation of the assembly code (and thus of the functionality of the executable code).

For example, mapping module 102 can map the x86 assembly language instruction:
  add [ebx], 5
(where [ebx] defines loading and storing the value pointed to by the register ebx) into intermediate representation instructions similar to:
  load t, ebx
  add t, 5
  store ebx, t.

Thus, the loading and storing functionality inherent in the [ebx] instruction is mapped to express instructions for loading and storing. Representing inherent functionality through express intermediate instructions can simplify analysis of executable code behavior. Mapping module 102 can then output the intermediate representation instructions to an intermediate representation of the assembly code that includes the [ebx] instruction.

Tracking module 106 is configured to receive an intermediate representation of assembly code. Tracking module 106 can perform data flow analysis on the intermediate representation. Tracking module 106 can track the path of parameters within functions in the intermediate representation. For example, tracking module 106 can track values that get shuffled around in registers and into and out of to memory locations. From the tracking, tracking module 106 can identify any parameter values and parameter types used to call functions of interest within executable (binary) code that was disassembled.

In some embodiments, tracking module 106 views operating system functions as functions that do not exhibit malicious behavior. Thus, tracking module 106 tracks the path of parameters within functions until an operating system function is called. When an operating system function is called, tracking module 106 can stop tracking parameters used to call the operating system function.

Tracking module 106 can output the results of data flow analysis performed on an intermediate representation to a display device. Based on the output, a user can judge whether or not an executable (binary) code exhibits any malicious behaviors.

FIG. 2 illustrates a flow chart of an example method 200 for identifying software execution behavior. Method 200 will be described with respect to the components and data of computer architecture 100.

Method 200 includes an act of accessing a portion of assembly code, the portion of assembly code disassembled from the portion of binary code, the portion of assembly code including assembly language instructions from an assembly language instruction set (act 201). For example, conversion module 103 can access assembly code 121. Disassembler 101 may have previously disassembled executable code 111 into assembly code 121. As depicted, assembly code 121 includes instructions 121A through 121N. The vertical ellipsis represents that additional instructions can be included between instructions 121A and 121N. Instructions 121A through 121N can be instructions from an assembly code instruction set, such as, for example, an x86 instruction set.

Method 200 includes an act of converting the portion of assembly code to an intermediate representation, the intermediate representation including intermediate representation instructions from an intermediate representation instruction set (act 202). For example, conversion module 103 can analyze assembly code 121 (e.g., can perform code analysis) to at least determine the behavior of individual state and declarations. More sophisticated analysis can consider assembly code 121 as a whole.

Based on the code analysis, conversion module 103 can convert assembly code 121 into intermediate representation instructions 123. As depicted, intermediate representation instructions 123 includes ordered lists 123A through 123N. The vertical ellipsis represents that additional ordered lists can be included between ordered list 123A and ordered list 123N. Ordered lists 123A through ordered list 123N can include intermediate representation instructions from intermediate representation instruction set 122.

Act 202 includes an act of mapping each assembly language instruction to a corresponding ordered list of one or more intermediate representation instructions so as to reduce the complexity of analyzing the behavior of the portion of binary code (act 203). For example, mapping module 104 can map each assembly language instruction in assembly code 121 to an ordered list of intermediate representation instructions. The mapping to intermediate representation instructions reduces the complexity of analyzing the behavior of executable code 111. As depicted by the dashed lines, instruction 121A maps to ordered list 123A and instruction 121N maps to ordered list 123N. Mapping to intermediate representation instructions can include reducing redundant instructions within the assembly code. Mapping module 104 can retain sufficient semantics from executable code 111 such that malicious behavior (if present) can be detected.

An ordered list can include a plurality of intermediate language instructions. In some embodiments, mapping an assembly code instruction to an ordered list includes essentially decomposing the assembly code instruction into micro operations.

For example, "scasd" is an x86 assembly language instruction. The "scasd" instruction takes a value stored in register eax and compares it against the four byte value located at the address pointed to by the es:edi register, compares those two values by subtracting them, which then in turn affects several flags (such as the "overflow" flag and "zero" flags which are part of another register, eflags), then increments or decrements edi based on the "direction" flag.

To alleviate the need to track side effects of the comparison, the scasd instruction can be broken down into intermediate representation instructions. Breaking done the scasd instruction can make analyzing the behavior of executable code 111 less complex. An ordered list of intermediate representation instructions representing scasd can be similar to:

READ target, es:edi
    MOVE match, eax
    SUB output, target, match
    IF output==0:
    SET ZF
    IF df==forward:
    ADD edi, 1
    ELSE:
    SUB edi, 1

The ordered list of intermediate representation instructions provides a sufficient representation of the scasd instruction for performing data flow analysis.

In some embodiments, conversion module 103 analyzes assembly code to identify each location where the assembly code calls an operating system function. Each transition between user functions and operating system functions is demarked based on the identified locations. In these embodiments, mapping module 104 maps assembly language instructions of the user functions to intermediate representation instructions. Mapping module 104 can ignore operating system functions.

During conversion, conversion module 103 can also keep track of a stack pointer used in the assembly code. Keeping track of a stack pointer can include accessing a stack delta for an operating system function and accessing the calling convention (e.g., either caller or callee) for the operating system function. Conversion module 103 can determine how to adjust the stack pointer based on the stack delta and calling convention for the operation system function.

Method 200 includes an act of tracking the path of one or more parameters within functions of the intermediate representation to identify one or more of: parameter values and parameter types used to call functions of interest within the portion of binary code (act 204). For example, tracking module 106 can (e.g., using data flow analysis) track the path of one or more parameters within functions of the intermediate representation instructions 123. From the tracking, tracking module 106 can identify one or more of: parameter values and parameter types used to call functions of interest within executable code 111. For example, tracking module can track the path of a filename as it is passed to deeper levels of functions. Tracking can stop when the filename reaches a system call.

Tracking the path of parameters can include identifying parameter values used to call operating system functions, such as, for example, functions that facilitate network access, opening a file, modifying a registry, activating computer system peripherals, capturing system input, performing cryptographic operations, manipulating processes, etc.

Method 200 includes an act of outputting one or more of: functions, parameter values, and parameters types of interest for the portion of binary code (act 205). For example, tracking module 106 can generate output 124 including functions, parameter values, and parameters types of interest for executable code 111. Analysis module 102 can display output 124 at display device 107. Thus, output 124 can indicate different behaviors of executable code 111 to a user without having to run executable code 111.

Figure 3:
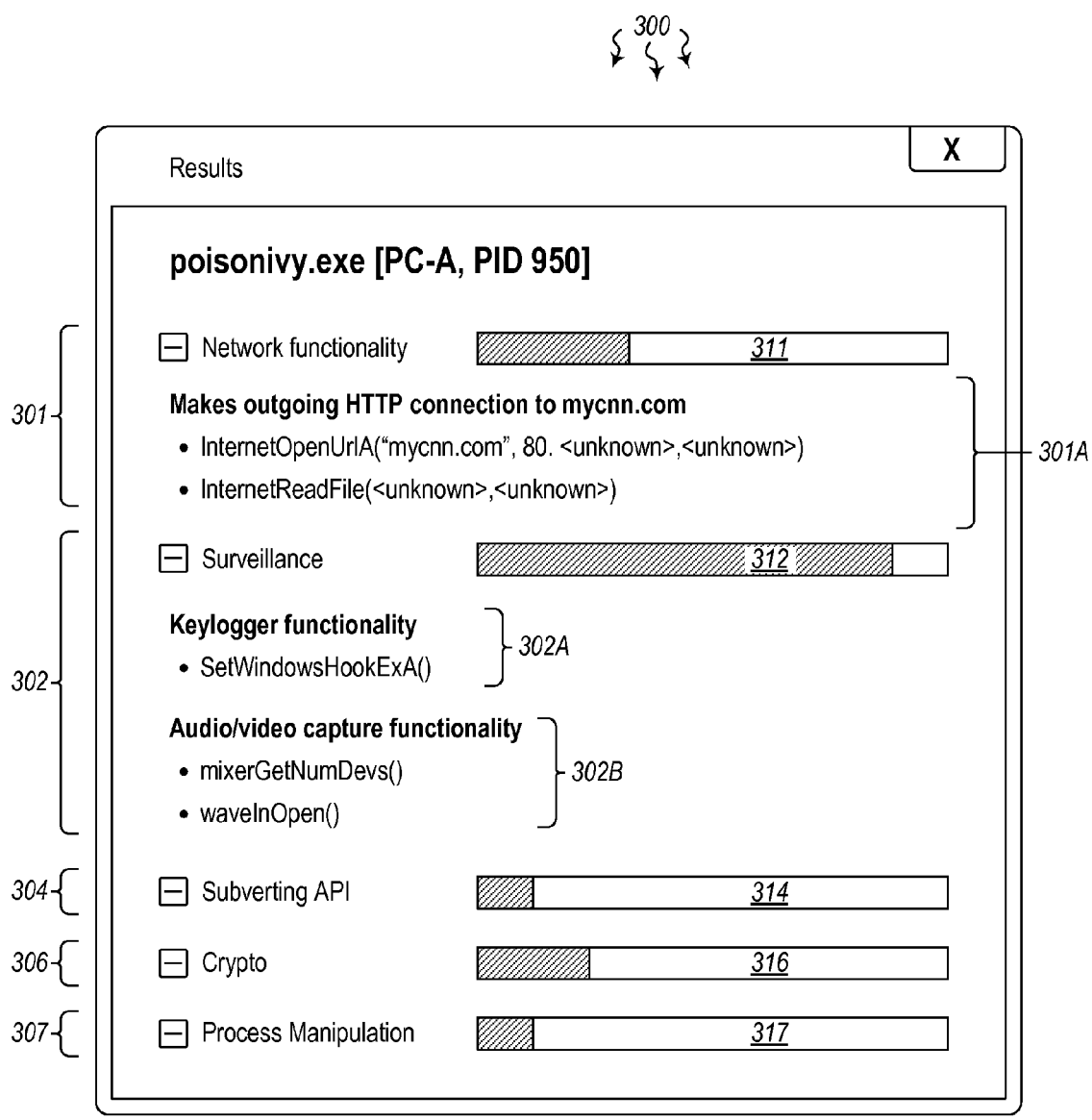
FIG. 3 illustrates an example user interface screen presenting categorized results of identifying software execution behavior for a portion of executable code.

In some embodiments, output is categorized according to functionality. FIG. 3 illustrates an example user interface screen 300 presenting categorized results of identifying software execution behavior for a portion of executable code. As depicted, behavior for the executable code "poisonivy.exe" is categorized into network functionality 301, surveillance 302, subverting API 304, crypto 306, and process manipulation 307.

Each category 301, 302, 304, 306 and 307 has a bar 311, 312, 314, 316, and 317 respectively indicating a level of activity for that category. Bars with more hatching indicate a higher level of activity in that category. Bars with less hatching indicate a lower level of activity in that category. For example, collectively, bars 311, 312, 314, 316, and 317 indicate that there is more activity in the surveillance category and network functionality category relative to other categories. Bars 311 and 312 together indicate that there is also more activity in the surveillance category than in the network functionality category.

More specific behaviors for some categories are also depicted. For example, under network functionality 301, behavior 301A indicates that poisonivy.exe makes an outgoing HTTP connection to mycnn.com using the InternetOpenUrlA( ) function and InternetReadFile( ) function. Further, under surveillance 302, behavior 302A indicates key logger functionality using the SetWindowsHookExA( ) function and behavior 302B indicates audio/video capture functionality using the mixerGetNumDevs( ) function and the waveInOpen( ) function.

Presenting categorized functions, parameter values, and parameter types of interest at display device 107 assists a user in determining if a corresponding portion of binary code includes malicious behaviors. For example, based on output from analysis module 102, such as, for example, a collection of information as categorized in user interface screen 300, a user can determine whether or not executable code, such as, for example, poisonivy.exe, is to be considered malicious.

Accordingly, embodiments of the invention can be used to assist a user in a making a reasoned and informed decision about whether the behavior of executable code is malicious. Data indicative of executable code behavior can be collected statically without having to execute the executable code. Behavior data can be collected essentially automatically with little, if any, user involvement. A user initiates analysis of executable code and is provided a visual categorized representation of behavior data for the executable code.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a computer system, the computer system including a microprocessor and system memory, a method for identifying execution behavior for a portion of binary code, the method comprising:
    an act of accessing a portion of assembly code via the microprocessor, the portion of assembly code disassembled from the portion of binary code, the portion of assembly code including assembly language instructions from an assembly language instruction set;
    an act of converting the portion of assembly code into an intermediate representation, the intermediate representation including intermediate representation instructions from an intermediate representation instruction set, converting the portion of assembly code including:
        an act of analyzing the portion of the assembly code to identify a location where the portion of the assembly code calls an operating system function;
        an act of demarking each transition between user functions and operating system functions based on the identified locations; and
        an act of mapping each assembly language instruction to a corresponding ordered list of one or more intermediate representation instructions so as to reduce the complexity of analyzing the behavior of the portion of binary code, wherein the act of mapping assembly language instructions to corresponding intermediate representation instructions comprises:
            an act of mapping the assembly language instructions of the user functions to intermediate representation instructions; and
            an act of ignoring the operating system function;
    an act of tracking the path of one or more parameters within functions of the intermediate representation to identify one or more of:
        parameter values and parameter types used to call functions of interest within the portion of binary code; and
    an act of outputting one or more of: functions, parameter values, and parameter types of interest for the portion of binary code.

2. The method as recited in claim 1, further comprising prior to accessing the portion of assembly code:
    an act of accessing the portion of binary code;
    an act of disassembling the portion of binary code into the portion of assembly code; and
    an act of outputting the portion of assembly code.

3. The method as recited in claim 1, wherein the act of converting the portion of assembly code into the intermediate representation comprises an act of keeping track of a stack pointer used in the portion of assembly code.

4. The method as recited in claim 3, wherein the act of keeping track of the stack pointer used in the portion of assembly code comprises, for each location where an operating system function is called by a calling convention:
    an act of accessing a stack delta for the operating system function;
    an act of accessing the calling convention for the operating system function; and
    an act of determining how to adjust the stack pointer based on the stack delta and the calling convention for the operating system function.

5. The method as recited in claim 1, wherein the act of tracking the path of one or more parameters within functions of the intermediate representation comprises an act of identifying parameter values used to call the operating system functions.

6. The method as recited in claim 1, wherein the act of mapping each assembly language instruction to a corresponding ordered list of one or more intermediate representation instructions comprises: an act of reducing redundant instructions within the portion of assembly code.

7. The method as recited in claim 1, wherein the act of tracking the path of one or more parameters within the functions of the intermediate representation comprises an act of identifying parameter values used to call functions that facilitate one or more of: network access, opening a file, modifying a registry, and activating computer system peripheral devices.

8. The method as recited in claim 1, wherein the act of tracking the path of one or more parameters within functions of the intermediate representation comprises an act of tracking values that are configured to get moved between system registers and system memory.

9. The method as recited in claim 1, wherein the act of outputting one or more of: functions, parameter values, and parameter types of interest for the portion of binary code, comprises: an act of categorizing functions, parameter values, and parameter types to simplify complexity and assist in identifying potentially malicious behavior exhibited by the portion of binary code.

10. The method as recited in claim 1, wherein the act of outputting one or more of: functions, parameter values, and parameter types of interest for the portion of binary code, comprises: an act of categorizing functions of interest based on operations the functions are configured to perform.

11. The method as recited in claim 10, wherein the act of categorizing functions of interest based on the operations the functions are configured to perform, comprises: an act of categorizing functions to indicate whether the functions are configured to perform operations selected from: network access, opening a file, modifying a registry, and activating computer system peripheral devices.

12. The method as recited in claim 1, further comprising an act of sending the output of one or more of: functions, parameter values, and parameter types of interest to a display device for presentation to a user, with the presentation to the user assisting the user in determining if the portion of binary code includes malicious behaviors.

13. A computer program product for use in a computer system, the computer system including a display device, the computer program product implementing a method for identifying execution behavior for a portion of binary code, the computer program product comprising one or more computer storage devices having stored thereon computer-executable instructions that, when executed by a microprocessor, cause the computer system to perform the method, the method including the following:
    accessing a portion of assembly code, the portion of assembly code disassembled from the portion of binary code, the portion of assembly code including assembly language instructions from an assembly language instruction set;

converting the portion of assembly code into an intermediate representation, the intermediate representation including intermediate representation instructions from an intermediate representation instruction set, said converting the portion of assembly code including:

analyzing the portion of assembly code to identify each location where the portion of assembly code calls an operating system function;

demarking each transition between user functions and operating system functions based on the identified locations; and mapping each assembly language instruction to a corresponding ordered list of one or more intermediate representation instructions so as to reduce the complexity of analyzing the behavior of the portion of binary code, wherein mapping each assembly language instruction comprises:

mapping assembly language instructions of the user functions to intermediate representation instructions; and ignoring the operating system functions;

tracking the path of one or more parameters within functions of the intermediate representation to identify one or more of: parameter values and parameter types used to call functions of interest within the portion of binary code;

outputting one or more of: functions, parameter values, and parameter types of interest for the portion of binary code; and presenting the one or more of: functions, parameter values, and parameter types of interest at the display device, said presentation via the display device assisting a user in determining if the portion of binary code includes malicious behaviors.

14. The computer program product as recited in claim 13, wherein converting the portion of assembly code into the intermediate representation comprises keeping track of a stack pointer used in the portion of assembly code.

15. The computer program product as recited in claim 13, wherein mapping each assembly language instruction to the corresponding ordered list of one or more intermediate representation instruction, comprises: reducing redundant instructions within the portion of assembly code.

16. The computer program product as recited in claim 13, wherein outputting the one or more of: functions, parameter values, and parameter types of interest for the portion of binary code comprises categorizing functions, parameter values, and parameter types to simplify complexity and assist in identifying potentially malicious behavior exhibited by the portion of binary code.

17. The computer program product as recited in claim 13, wherein outputting the one or more of: functions, parameter values, and parameter types of interest for the portion of binary code comprises categorizing functions of interest based on the operations the functions are configured to perform.

18. In a computer system, the computer system including a microprocessor, system memory, and a display device, a method for identifying execution behavior for a portion of binary code, the method comprising:

an act of accessing a portion of assembly code via the microprocessor, the portion of assembly code disassembled from the portion of binary code, the portion of assembly code including assembly language instructions from an assembly language instruction set;

an act of converting the portion of assembly code into an intermediate representation, the intermediate representation including intermediate representation instructions from an intermediate representation instruction set, converting the portion of assembly code including:

an act of analyzing the portion of assembly code to identify each location where the portion of assembly code calls an operating system function;

an act of demarking each transition between user functions and operating system functions based on the identified locations; and an act of mapping each assembly language instruction to a corresponding ordered list of one or more intermediate representation instructions so as to reduce the complexity of analyzing the behavior of the portion of binary code, including for at least one assembly language instruction decomposing the assembly language instruction in to a plurality of micro operations to simplify analysis of the portion of binary code, wherein the act of mapping the assembly language instructions to corresponding intermediate representation instructions comprises:

an act of mapping assembly language instructions of the user functions to intermediate representation instructions; and an act of ignoring the operating system functions;

an act of tracking the path of one or more parameters within functions of the intermediate representation to identify one or more of:

parameter values and parameter types used to call functions of interest within the portion of binary code;

an act of categorizing functions, parameter values, and parameter types to simplify the complexity of identifying potentially malicious behavior exhibited by the portion of binary code; and an act of presenting the categorized functions, parameter values, and parameter types of interest at the display device, presentation at the display device assisting a user in determining if the portion of binary code includes malicious behaviors.

* * * * *